(12) United States Patent
Kawahara et al.

(10) Patent No.: US 7,042,935 B2
(45) Date of Patent: May 9, 2006

(54) EQUALIZER AND EQUALIZATION METHOD

(75) Inventors: Nobuaki Kawahara, Tokyo (JP); Masashi Naito, Tokyo (JP)

(73) Assignee: Hitachi Kokusai Electric, Inc., Tokyo (JP)

( * ) Notice: Subject to any disclaimer, the term of this patent is extended or adjusted under 35 U.S.C. 154(b) by 841 days.

(21) Appl. No.: 10/011,273

(22) Filed: Dec. 11, 2001

(65) Prior Publication Data

US 2002/0172272 A1    Nov. 21, 2002

(30) Foreign Application Priority Data

May 17, 2001    (JP)    ............................. 2001-147574

(51) Int. Cl.
*H03H 7/30*    (2006.01)
(52) U.S. Cl. .......................... 375/229; 333/16; 333/28; 708/300; 708/819
(58) Field of Classification Search .................. 375/58, 375/13, 229; 364/726
See application file for complete search history.

(56) References Cited

U.S. PATENT DOCUMENTS

| | | | | |
|---|---|---|---|---|
| 4,201,959 A | * | 5/1980 | Niiro et al. .................... | 333/16 |
| 4,206,509 A | * | 6/1980 | Ruehle ......................... | 367/42 |
| 5,260,972 A | * | 11/1993 | Wang .......................... | 375/285 |
| 5,822,368 A | * | 10/1998 | Wang .......................... | 375/229 |
| 6,219,378 B1 | | 4/2001 | Wu | |
| 2001/0048717 A1 | * | 12/2001 | Ougi et al. .................. | 375/231 |
| 2003/0058968 A1 | * | 3/2003 | Thomson et al. ........... | 375/340 |
| 2005/0018754 A1 | * | 1/2005 | Song .......................... | 375/142 |

FOREIGN PATENT DOCUMENTS

| | | |
|---|---|---|
| EP | 0 800 287 A2 | 10/1997 |
| EP | 1195961 A2 * | 4/2002 |

OTHER PUBLICATIONS

European Search Report dated Oct. 29, 2003.
Petri Komulainen, et al., "Adaptive Channel Equalization and Interference Suppression for CDMA Downlink", IEEE 6th Int. Symp. on Spread-Spectrum Tech. & Appl., vol. 2, Sep. 6, 2000, pp. 363-367, XP010516602.

* cited by examiner

Primary Examiner—Stephen Chin
Assistant Examiner—Erin M. File
(74) Attorney, Agent, or Firm—McGinn IP Law Group, PLLC

(57) ABSTRACT

An equalizer and an equalization method capable of suppressing distortion specific to radio unit and reducing both the oversampling number and the amount of calculations without causing characteristic deterioration. The equalizer, which equalizes a received signal with periodically inserted known pilot symbols, includes a synchronization processing section that detects symbol synchronization points using pilot symbols included in the received signal, a plurality of equalization factor calculation sections which use the symbol synchronization points and points shifted in time before and after the symbol synchronization point as symbol synchronization point candidates, and calculate equalization factors for the respective symbol synchronization point candidates, and an optimization/equalization processing section which selects an optimal symbol synchronization point and corresponding optimal equalization factor from among a plurality of symbol synchronization point candidates and corresponding equalization factors, and equalizes the received signal using the optimal equalization factor.

10 Claims, 5 Drawing Sheets

EQUALIZER AND EQUALIZATION METHOD

BACKGROUND OF THE INVENTION

1. Field of the Invention

The present invention relates to an equalizer and equalization method for equalization for avoiding characteristic deterioration due to symbol synchronization errors between transmitter and receiver, which is often a problem arising in mobile communications, etc.

2. Description of the Related Art

To respond to increasing demands of mobile communications using a limited frequency band, it is necessary to increase frequency utilization efficiency. An example of the most efficient means of this is QAM (Quadrature Amplitude Modulation).

Using the QAM for a mobile communication requires changes in the envelope and phase due to fading variations to be coped with. Examples of countermeasures are disclosed in "Transmission Path Distortion Compensation System" disclosed in Japanese Patent Publication No. 6-1908 and Reference 1: "16 QAM Fading Distortion Compensation System for Terrestrial Mobile Communications" (Sanpei, et al., Institute of Electronics, Information and Communication Engineers Collected Papers B-II, Vol. J72-B-II No.1 pp7–15, January 1989). This proposed system is a pilot symbol interpolation synchronous detection system that measures fading distortion from periodically inserted known frame symbols and estimates and compensates for fading distortion of all frame symbols by interpolating the time series. In this case, 16 QAM is often used as the target modulation system.

In association with the above-described proposed system, Reference 2: "16 QAM/TDMA-Based Symbol Timing Reproduction System" (Sanpei, et al., TECHNICAL REPORT of Institute of Electronics, Information and Communication Engineers (RCS92-106 (1993-01)) is proposed. The MAM (Maximum Amplitude Method) used here is a method of using a sample showing a maximum amplitude as a synchronization point. Provided that a known frame symbol has a maximum amplitude, a simulation result confirms that if the frame length is a few tens of symbols and the oversampling number is 32 times, the MAM can obtain a satisfactory characteristic.

Here, a modulation/demodulation apparatus for carrying out above-described fading distortion compensation will be explained. FIG. 6 is a block diagram showing a configuration example of a conventional modulation/demodulation apparatus. As shown in FIG. 6, the transmitter is constructed of a pilot symbol adding section 101, amapping section 102, aquadrature modulation section 103, abaseband-RF conversion section 104 and an antenna 105. On the other hand, the receiver is constructed of an antenna 106, an RF-baseband conversion section 107, a quadrature detection section 108, a synchronization processing section 109, a pilot symbol distortion measuring section 110, a symbol data distortion compensation section 111 and a de-mapping section 112.

First, an operation of the transmitter will be explained. The pilot symbol adding section 101 adds pilot symbols to an input digital signal string and outputs the result to the mapping section 102 as a pilot symbol insertion signal string.

The mapping section 102 carries out mapping processing on the pilot symbol insertion signal string according to a mapping table which is common to the transmitter and receiver and outputs the result to the quadrature modulation section 103 as an I-phase mapping signal and Q-phase mapping signal.

The quadrature modulation section 103 carries out quadrature modulation processing using the I-phase mapping signal and Q-phase mapping signal and outputs the result to the baseband-RF conversion section 104 as a baseband modulation signal.

The baseband-RF conversion section 104 converts the baseband modulation signal to an RF modulation signal and outputs to the antenna 105. The antenna 105 outputs the RF modulation signal to a radio communication path.

Then, an operation of the receiver will be explained. The RF-baseband conversion section 107 converts the RF modulation signal received by the antenna 106 to a baseband modulation signal and outputs to the quadrature detection section 108.

The quadrature detection section 108 carries out quadrature detection processing on the baseband modulation signal and outputs the result to the synchronization processing section 109 as a quadrature detection I-phase signal and quadrature detection Q-phase signal.

The synchronization processing section 109 detects frame timings from the quadrature detection I-phase signal and quadrature detection Q-phase signal using synchronization timing detecting means such as an MAM and outputs the result to the pilot symbol distortion measuring section 110 and symbol data distortion compensation section 111 as an I-phase frame signal and Q-phase frame signal.

The pilot symbol distortion measuring section 110 measures the amount of distortion of pilot symbols from the I-phase frame signal and Q-phase frame signal and outputs the result to the symbol data distortion compensation section 111.

The symbol data distortion compensation section 111 compensates the I-phase frame signal and Q-phase frame signal for distortion based on the distortion measured value and outputs the result to the de-mapping section 112 as the I-phase distortion compensated signal and Q-phase distortion compensated signal.

The de-mapping section 112 carries out de-mapping processing on the I-phase distortion compensated signal and Q-phase distortion compensated signal according to a mapping table which is common to the transmitter and receiver and outputs the result to the outside as an output digital signal string.

While the conventional modulation/demodulation apparatus has effects on fading distortion, it has a defect that compensation for distortion specific to radio unit is not considered. When the oversampling number is large, the amount of calculations becomes enormous as the communication speed increases, which is a significant problem in design. Reducing the oversampling number to solve this problem will cause another problem of producing a floor error due to jitter.

SUMMARY OF THE INVENTION

The present invention is intended to obviate the problems as referred to above and has for its object to provide an equalizer and equalization method capable of suppressing distortion specific to radio unit, reducing both the number of oversamplings and amount of calculations without causing characteristic deterioration.

Bearing the above object in mind, according to a first aspect of the present invention, there is provided an equalizer for equalizing a received signal with periodically inserted known symbols, the equalizer comprising: synchronizing means for detecting symbol synchronization points using the known symbols included in the received signal; a plurality of equalization factor calculating means for using the symbol synchronization points and points time-shifted before and after the symbol synchronization points as symbol synchronization point candidates and calculating respective equalization factors for the symbol synchronization point candidates; and optimal equalizing means for selecting an optimal symbol synchronization point and the corresponding optimal equalization factor from among the plurality of symbol synchronization point candidates and the corresponding equalization factors and equalizing the received signal using the optimal equalization factor.

With this arrangement, by calculating equalization factors using a plurality of symbol synchronization point candidates in parallel, selecting an optimal equalization factor from the calculated plurality of equalization factors and equalizing the received signal using the selected equalization factor, distortion specific to radio unit can be compensated for, thus avoiding characteristic deterioration caused by jitter generated when the oversampling number is small.

In a preferred form of the first aspect of the present invention, the known symbols are pilot symbols with the maximum amplitude of all symbols.

Thus, the synchronizing means can detect symbol synchronization points because pilot symbols take maximum amplitudes of all symbols.

In another preferred form of the first aspect of the present invention, the plurality of equalization factor calculating means calculates the equalization factors corresponding to the respective symbol synchronization point candidates in parallel.

Thus, by calculating equalization factors for a plurality of symbol synchronization point candidates, the optimal equalizing means can detect optimal symbol synchronization points with high accuracy.

In a further preferred form of the first aspect of the present invention, the optimal equalizing means stores past optimal symbol synchronization points and selects the optimal symbol synchronization points from among the plurality of symbol synchronization point candidates using the past optimal symbol synchronization point.

Accordingly, by comparing past optimal symbol synchronization points and current symbol synchronization detection points, the optimal equalizing means can detect optimal symbol synchronization points with high accuracy.

In a still further preferred form of the first aspect of the present invention, the optimal equalizing means compares equalization results using the corresponding equalization factors for the plurality of symbol synchronization point candidates and selects the symbol synchronization point candidate with the optimal equalization result as the optimal symbol synchronization point.

Thus, by comparing equalization results using equalization factors corresponding to a plurality of symbol synchronization point candidates, the optimal equalizing means can detect optimal symbol synchronization points with high accuracy.

In the equalizer according to the present invention, the plurality of equalization factor calculating means can also calculate equalization factors using uniformly spaced samples before and after the symbol synchronization point candidates and the optimal equalizing means can also be provided with a tap corresponding to the sample timing. According to such a configuration, the optimal equalizing means can detect optimal symbol synchronization points with high accuracy by comparing equalization results using equalization factors corresponding to a plurality of symbol synchronization point candidates.

Moreover, it is possible to set the time shift to ½ symbol time or less, and according to such a configuration, the optimal equalizing means can detect optimal symbol synchronization points with high accuracy by comparing symbol synchronization point candidates with intervals of ½ symbol time or less.

Furthermore, it is also possible to adopt QAM as the modulation/demodulation system and such a configuration with the QAM-based modulation/demodulation system can increase the frequency utilization efficiency.

According to a second aspect of the present invention, there is provided an equalization method for equalizing a received signal with periodically inserted known symbols, the method comprising the steps of: detecting symbol synchronization points using the known symbols included in the received signal; using the symbol synchronization points and points time-shifted before and after the symbol synchronization points as symbol synchronization point candidates and calculating respective equalization factors for the symbol synchronization point candidates; and selecting an optimal symbol synchronization point and the corresponding optimal equalization factor from among the plurality of symbol synchronization point candidates and the corresponding equalization factors and equalizing the received signal using the optimal equalization factor.

With this method, by calculating equalization factors for a plurality of symbol synchronization point candidates in parallel, selecting an optimal equalization factor from the calculated plurality of equalization factors and equalizing the received signal using the selected equalization factor, it is possible to compensate for distortion specific to radio unit and avoid characteristic deterioration caused by jitter generated when the oversampling number is small.

In a preferred form of the second aspect of the present invention, the known symbols are pilot symbols with the maximum amplitude of all symbols.

Thus, the synchronizing means can detect symbol synchronization points because pilot symbols take maximum amplitudes of all symbols.

In another preferred form of the second aspect of the present invention, the calculating step of calculating equalization factors corresponding to the respective symbol synchronization point candidates is carried out by calculating the equalization factors corresponding to the respective symbol synchronization point candidates in parallel.

Accordingly, by calculating equalization factors for a plurality of symbol synchronization point candidates in parallel, the optimal equalizing means can detect optimal symbol synchronization points with high accuracy.

In a further preferred form of the second aspect of the present invention, the optimal equalizing step is carried out by storing past optimal symbol synchronization points and selecting the optimal symbol synchronization points from among the plurality of symbol synchronization point candidates using the past optimal symbol synchronization point.

Thus, by comparing past optimal symbol synchronization points and current symbol synchronization detection points, the optimal equalizing means can detect optimal symbol synchronization points with high accuracy.

In a still further preferred form of the second aspect of the present invention, the optimal equalizing step is carried out by comparing equalization results using the equalization factors for the plurality of symbol synchronization point candidates and selecting the symbol synchronization point candidate with the optimal equalization result as the optimal symbol synchronization point.

Thus, by comparing equalization results using equalization factors corresponding to a plurality of symbol synchronization point candidates, the optimal equalizing means can detect optimal symbol synchronization points with high accuracy.

Further, according to the present invention, an equalization method for equalizing a received signal with periodically inserted known pilot symbols may comprise a step of detecting symbol synchronization points using the pilot symbols included in the received signal, a step of calculating equalization factors at the symbol synchronization points and points time-shifted before and after these symbol synchronization points, and a step of selecting an optimal equalization factor from among a plurality of the equalization factors and optimal symbol synchronization points and equalizing the received signal using the optimal equalization factor.

Such a configuration makes it possible to calculate equalization factors for a plurality of symbol synchronization point candidates in parallel, select an optimal equalization factor from the calculated plurality of equalization factors, equalize the received signal using the selected equalization factor, and thereby compensate for distortion specific to radio unit and avoid characteristic deterioration caused by jitter generated when the oversampling number is small.

The above and other objects, features and advantages of the present invention will become more readily apparent to those skilled in the art from the following detailed description of a preferred embodiment of the present invention taken in conjunction with the accompanying drawings.

DESCRIPTION OF THE PREFERRED EMBODIMENT

Figure 1:
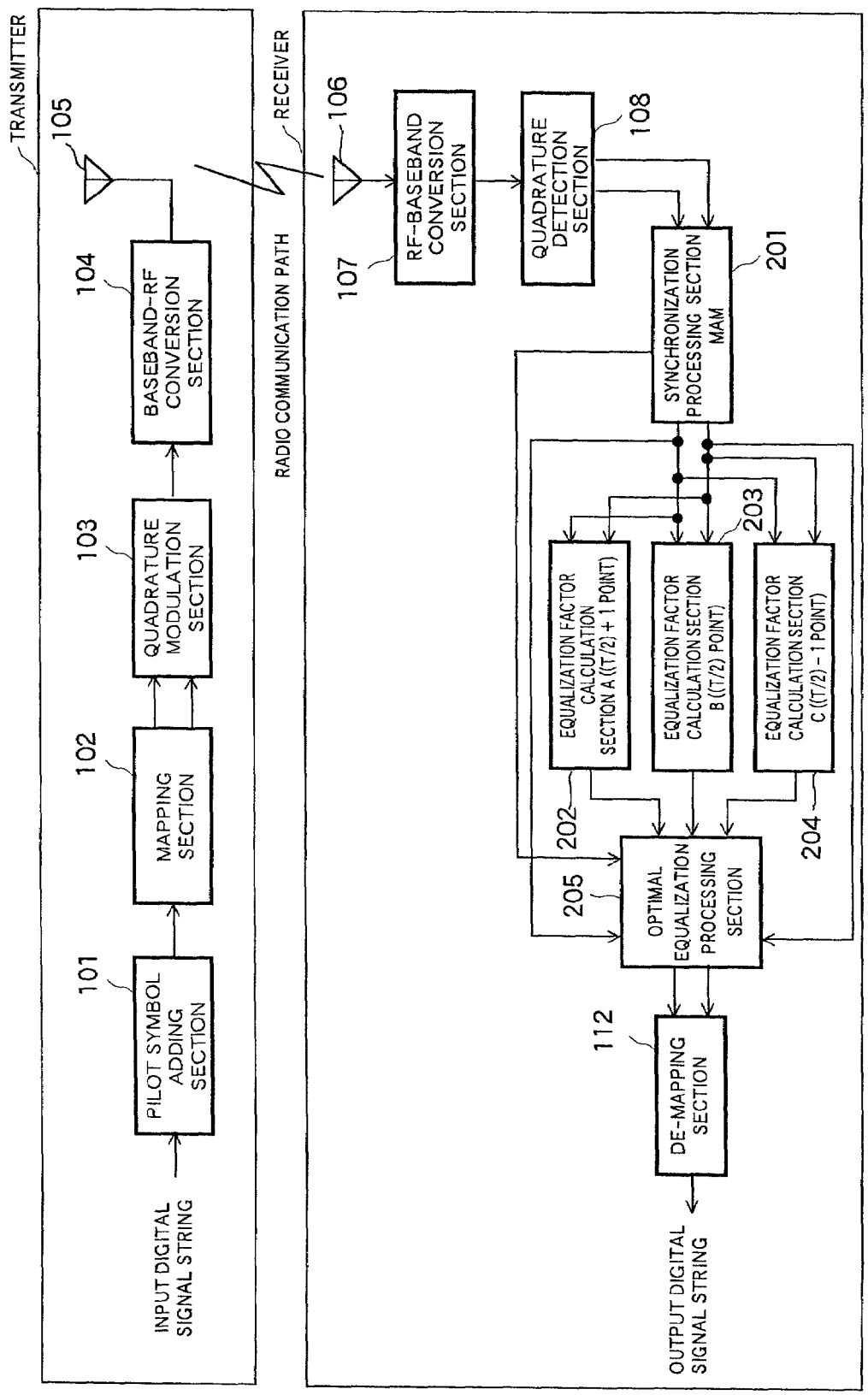
FIG. 1 is a block diagram showing a configuration example of a modulation/demodulation apparatus using an equalizer according to an embodiment of the present invention.

Now, a preferred embodiment of the present invention will be described below in detail while referring to the accompanying drawings. FIG. 1 illustrates a configuration example of a modulation/demodulation apparatus using an equalizer according to the embodiment of the present invention. As shown in FIG. 1, a transmitter of the apparatus includes a pilot symbol adding section 101, a mapping section 102, a quadrature modulation section 103, a baseband-RF conversion section 104 and an antenna 105. On the other hand, a receiver of the apparatus includes an antenna 106, an RF-baseband conversion section 107, a quadrature detection section 108, a synchronization processing section 201, an equalization factor calculation section A202, an equalization factor calculation section B203, an equalization factor calculation section C204, an optimization/equalization processing section 205 and a de-mapping section 112.

Here, an example will be explained where one symbol is inserted for data whose modulation system is 16 QAM, transmission rate is 4.8 kbps, oversampling number is 8 times and pilot symbols are 4 bits.

Figure 2:
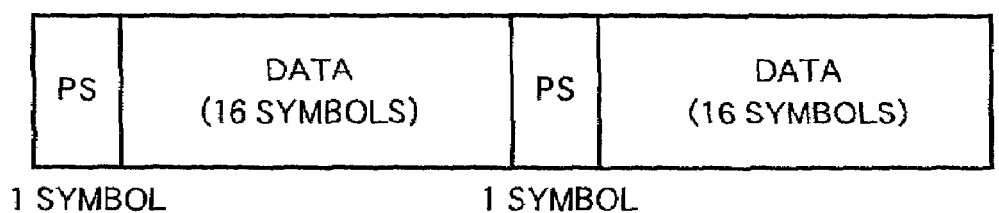
FIG. 2 illustrates an example of a frame configuration according to this embodiment.
Figure 3:
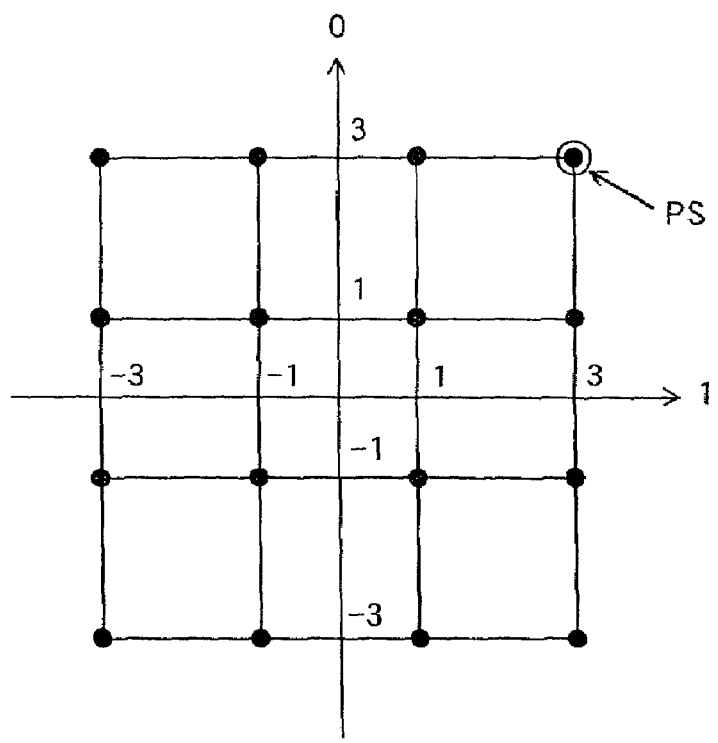
FIG. 3 illustrates mapping positions of known pilot symbols.

FIG. 2 illustrates an example of a frame configuration according to this embodiment. One frame consists of 16 symbols of data to be sent followed by a 1-symbol pilot symbol. FIG. 3 illustrates an example of mapping positions of known pilot symbols. As shown in FIG. 3, known pilot symbols are mapped in such a way that both I and Q phases take maximum positive values.

Figure 6:
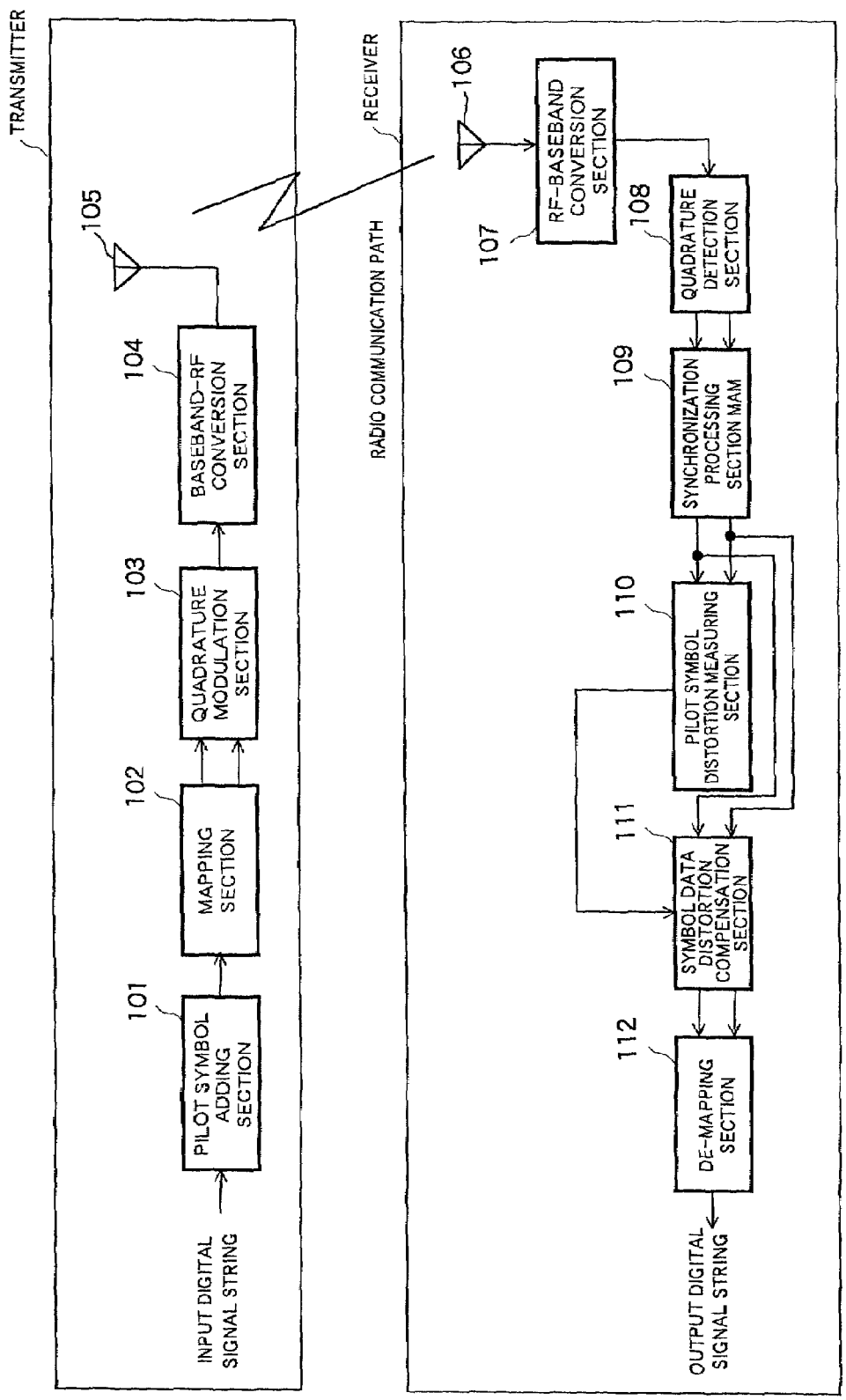
FIG. 6 is a block diagram showing a configuration example of a conventional modulation/demodulation apparatus.

Then, an operation of the modulation/demodulation apparatus of this embodiment will be explained with reference to FIG. 1. In FIG. 1, the same reference numerals as those in FIG. 6 denote the same sections as or sections equivalent to the sections shown in FIG. 6 and explanations thereof will be omitted here. The synchronization processing section 201 detects a symbol synchronization detection point of a pilot symbol using synchronization timing detecting means such as MAM from the quadrature detection I-phase signal and quadrature detection Q-phase signal output from the quadrature detection section 108 and outputs the following timing and the quadrature detection I-phase signal and quadrature detection Q-phase signal to the equalization factor calculation section A202, equalization factor calculation section B203 and equalization factor calculation section C204, which are placed in parallel.

The synchronization processing section 201 outputs the symbol synchronization detection point to the optimization/equalization processing section 205. On the other hand, the synchronization processing section 201 outputs the quadrature detection I-phase signal and quadrature detection Q-phase signal at a point of (symbol synchronization detection point+1 sample) to the equalization factor calculation section A202 as a synchronization I-phase signal A and synchronization Q-phase signal A, respectively. Here, a time shift with respect to the symbol synchronization detection point is assumed to be +1 sample, but the time shift can be any value not exceeding +½ symbol.

Similarly, the synchronization processing section 201 outputs the quadrature detection I-phase signal and quadrature detection Q-phase signal at the symbol synchronization detection point to the equalization factor calculation section B203 as a synchronization I-phase signal B and synchronization Q-phase signal B, respectively.

Likewise, the synchronization processing section 201 outputs the quadrature detection I-phase signal and quadrature detection Q-phase signal at the point of (symbol synchronization detection point−1 sample) to the equalization factor calculation section C204 as a synchronization I-phase signal C and synchronization Q-phase signal C, respectively. Here, the time shift with respect to the symbol synchronization detection point is assumed to be −1 sample, but the time shift can be any value not exceeding −½ symbol.

Here, suppose a tap of equalization processing at the optimization/equalization processing section 205 is ½ symbol. The equalization factor calculation section A202 calculates an equalization factor of the ½ symbol step using, for example, 3 symbols of synchronization I-phase signal A and synchronization Q-phase signal A and outputs the result to the optimization/equalization processing section 205 as an equalization factor A.

Similarly, the equalization factor calculation section B203 calculates an equalization factor of the ½ symbol step using, for example, 3 symbols of synchronization I-phase signal B and synchronization Q-phase signal B and outputs the result to the optimization/equalization processing section 205 as an equalization factor B.

Likewise, the equalization factor calculation section C204 calculates an equalization factor of the ½ symbol step using, for example, 3 symbols of synchronization I-phase signal C and synchronization Q-phase signal C and outputs the result to the optimization/equalization processing section 205 as an equalization factor C. The tap interval can be n/N symbol (n: an integer not exceeding N including 0, N: oversampling number of received signal).

Here, an example of the equalization processing means will be explained. As a result of a comparison with past stored optimal symbol synchronization points, the optimization/equalization processing section 205 selects an optimal point from among symbol synchronization detection points and symbol synchronization detection points ±1 sample point as an optimal symbol synchronization point and selects an equalization factor corresponding to the point as an optimal equalization factor. Then, the optimization/equalization processing section 205 equalizes the synchronization I-phase signal and synchronization Q-phase signal according to the optimal equalization factor and outputs the resultant equalization I-phase signal and equalization Q-phase signal to the de-mapping section 112. Moreover, the optimization/equalization processing section 205 stores the optimal synchronization points.

Then, another example of the equalization processing means will be explained. The optimization/equalization processing section 205 equalizes the corresponding synchronization I-phase signal and synchronization Q-phase signal according to the equalization factors A, B and C corresponding to a plurality of points entered and regards the results as equalization output A, B and C, respectively. Then, the optimization/equalization processing section 205 selects an optimal equalization output from among the equalization output A, B and C, regards the selected output as an equalization I-phase signal and equalization Q-phase signal and outputs this output to the de-mapping section 112.

The de-mapping section 112 carries out de-mapping processing on the equalization I-phase data and equalization Q-phase data according to the mapping table common to the transmitter and receiver and outputs the result to the outside as an output digital signal string.

Figure 4:
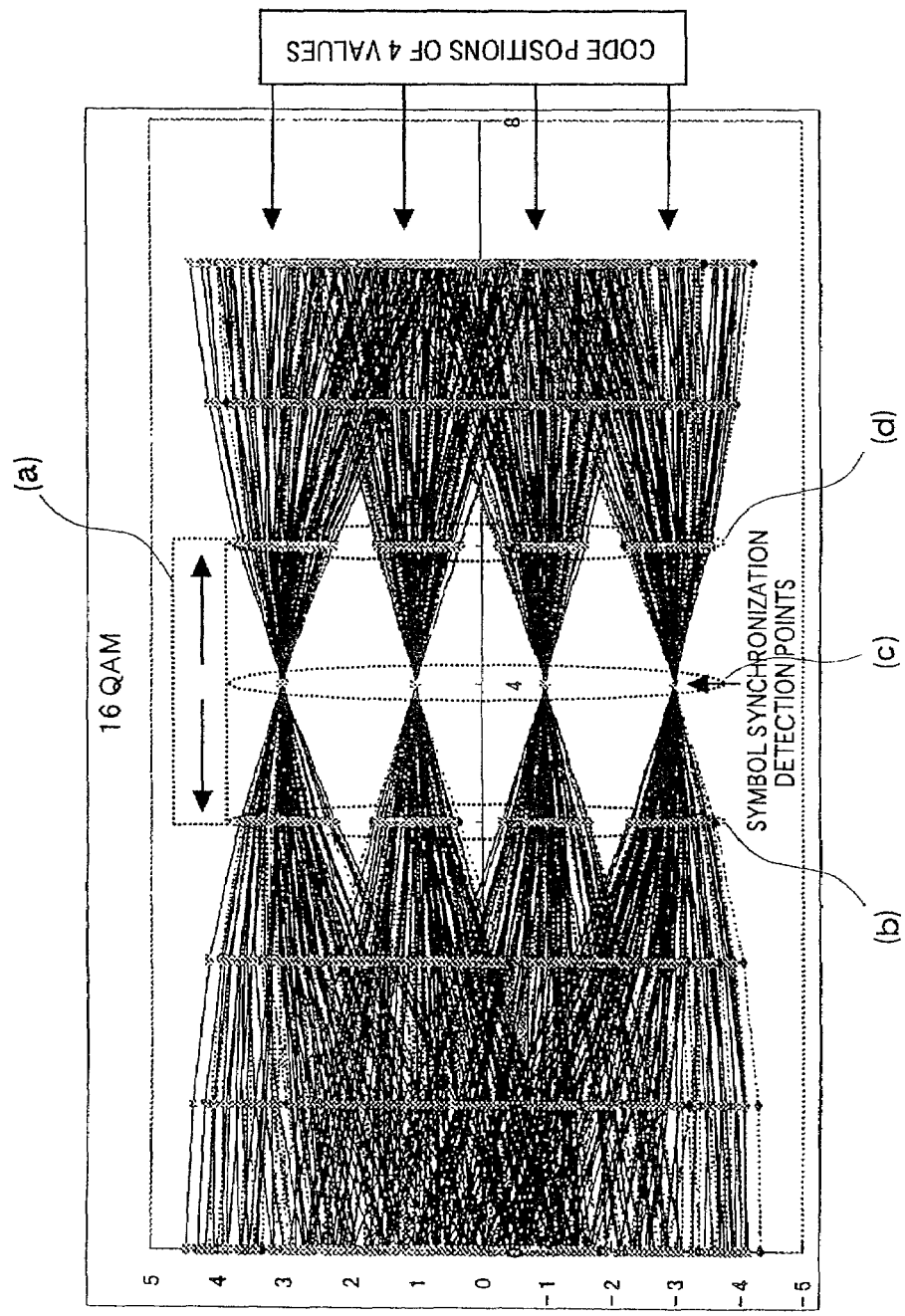
FIG. 4 illustrates an example of a transmission eye pattern before quadrature demodulation with a 16 QAM.

FIG. 4 illustrates an example of a transmission eye pattern before quadrature demodulation with a 16 QAM. FIG. 4 is obtained by overlapping 1-symbol sections of a plurality of symbol patterns. The horizontal axis denotes the time. The oversampling number is 8 times.

When a code decision is made on the received signal (a 4-value code in the case of FIG. 4), if data is demodulated at an optimal symbol synchronization point, that is, timing at which the inter-code distance from the neighboring code is the largest, influences of noise are small and the error rate characteristic becomes the best. On the contrary, if data is demodulated at timing at which the distance from the neighboring code is small, that is, timing shifted from the optimal symbol synchronization point, influences of noise are large and the error rate characteristic deteriorates.

The optimal symbol synchronization point of the transmission eye pattern may fluctuate horizontally as shown in (a) in FIG. 4. It is difficult to find an optimal symbol synchronization point in such a situation. Here, suppose the point at which symbol synchronization is detected when there is no fluctuation is a symbol synchronization detection point in (c) in FIG. 4 and the points shifted by −1 sample and +1 sample from the symbol synchronization point are (b) and (d), respectively, in FIG. 4. The above-described equalization factor calculation sections A202, B203 and C204 calculate equalization factors at points (d), (c) and (b) in parallel and the optimization/equalization processing section 205 selects an optimal point for equalization processing and carries out equalization processing using the selected equalization factors.

Figure 5:
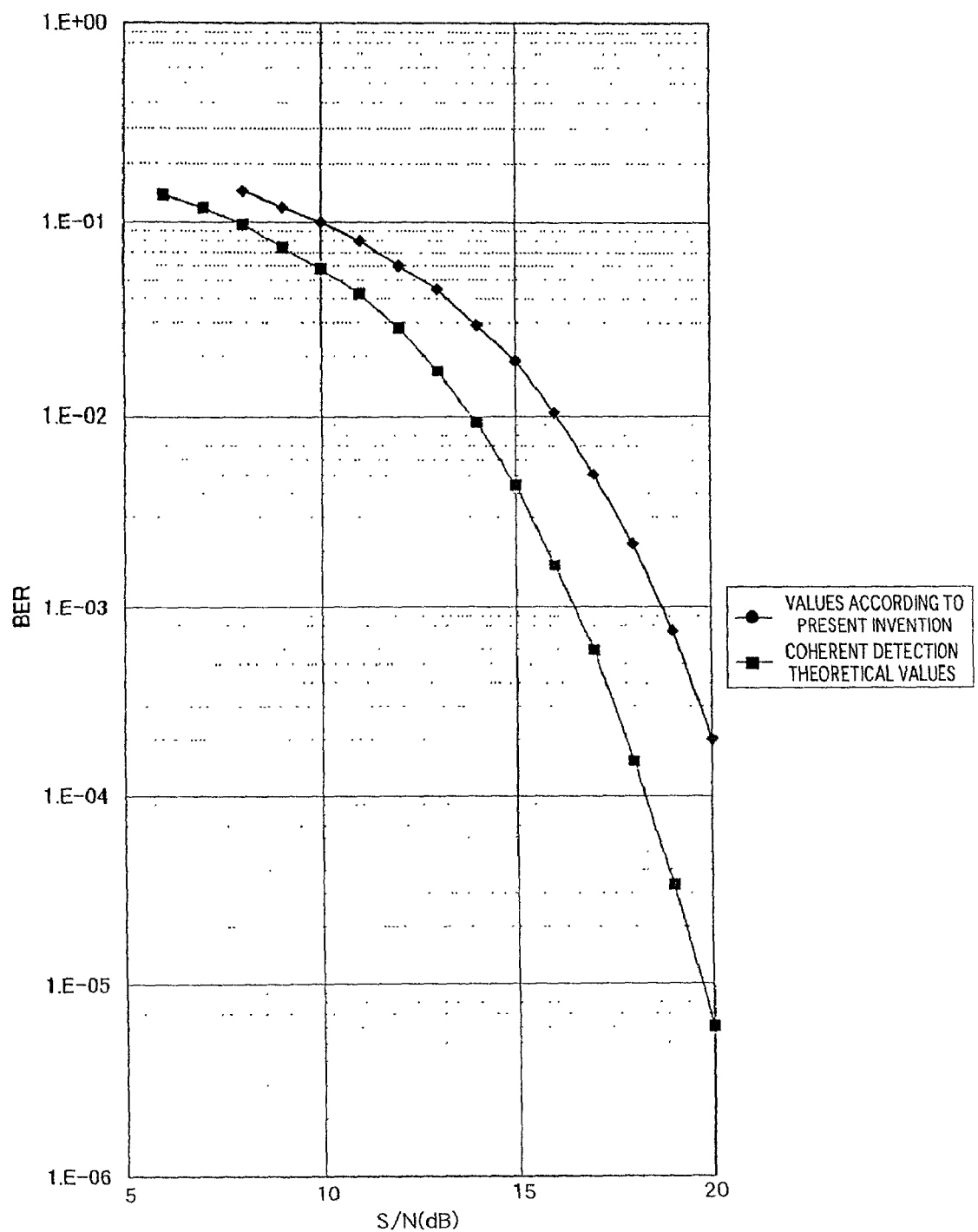
FIG. 5 illustrates a static characteristic and synchronous detection theoretical values in this embodiment.

Then, the result when the above-described configuration is implemented by a DSP will be explained. FIG. 5 illustrates a static characteristic and synchronous detection theoretical values in this embodiment. In FIG. 5, the horizontal axis denotes an S/N, while the vertical axis denotes an error rate. The fact that the static characteristic is deteriorated from the synchronous detection theoretical values may be assumed to be the deterioration attributable to reduction of energy due to inserted pilot symbols, quantization errors of A/D conversion and D/A conversion of hardware and quadrature detection.

As detailed above, according to the present invention, equalization factors are calculated at the symbol synchronization detection point and at points shifted from symbol synchronization detection point by ±1 sample, and the past optimal symbol synchronization points are compared with the current symbol synchronization detection point. Then, an optimal equalization factor is selected from among the calculated plurality of equalization factors, and the received signal is equalized using the selected equalization factor, whereby distortion specific to radio unit can be compensated for, thus avoiding characteristic deterioration caused by jitter generated when the oversampling number is small. Furthermore, the optimization/equalization processing section 205 in this embodiment includes three taps and it is confinned that the amount of calculations of each equalization processing falls within a range of 1 k steps.

What is claimed is:

1. An equalizer for equalizing a received signal with periodically inserted known symbols, said apparatus comprising:
synchronizing means for detecting symbol synchronization points using periodically inserted known symbols included in said received signal;
a plurality of equalization factor calculating means for using said symbol synchronization points and points time-shifted before and after said symbol synchronization points as a plurality of symbol synchronization point candidates and calculating respective equalization factors for said symbol synchronization point candidates; and
optimal equalizing means for selecting an optimal symbol synchronization point and a corresponding optimal equalization factor from among said plurality of symbol synchronization point candidates and said corresponding equalization factors and equalizing said received signal using said optimal equalization factor.

2. The equalizer according to claim 1, wherein said known symbols are pilot symbols with the maximum amplitude of all symbols.

3. The equalizer according to claim 1, wherein said plurality of equalization factor calculating means calculates said equalization factors corresponding to said respective symbol synchronization point candidates in parallel.

4. The equalizer according to claim 1, wherein said optimal equalizing means stores past optimal symbol synchronization points and selects said optimal symbol synchronization points from among a plurality of symbol synchronization point candidates using said past optimal symbol synchronization points.

5. The equalizer according to claim 1, wherein said optimal equalizing means compares equalization results using said corresponding equalization factors for said plurality of symbol synchronization point candidates and selects the symbol synchronization point candidate with said optimal equalization result as said optimal symbol synchronization point.

6. An equalization method for equalizing a received signal with periodically inserted known symbols, said method comprising:
   detecting symbol synchronization points using periodically inserted known symbols included in said received signal;
   using said symbol synchronization points and points time-shifted before and after said symbol synchronization points as symbol synchronization point candidates and calculating respective equalization factors for said symbol synchronization point candidates; and
   selecting an optimal symbol synchronization point and a corresponding optimal equalization factor from among a plurality of symbol synchronization point candidates and said corresponding equalization factors and equalizing said received signal using said optimal equalization factor.

7. The equalization method according to claim 6, wherein said known symbols are pilot symbols with the maximum amplitude of all symbols.

8. The equalization method according to claim 6, wherein said calculating step of calculating equalization factors corresponding to said respective symbol synchronization point candidates is carried out by calculating said equalization factors corresponding to said respective symbol synchronization point candidates in parallel.

9. The equalization method according to claim 6, wherein said optimal equalizing step is carried out by storing past optimal symbol synchronization points and selecting said optimal symbol synchronization points from among a plurality of symbol synchronization point candidates using said past optimal symbol synchronization points.

10. The equalization method according to claim 6, wherein said optimal equalizing step is carried out by comparing equalization results using said equalization factors for a plurality of symbol synchronization point candidates and selecting the symbol synchronization point candidate with said optimal equalization result as said optimal symbol synchronization point.

* * * * *